United States Patent
Tolbaños

[11] Patent Number: 5,678,705
[45] Date of Patent: Oct. 21, 1997

[54] MODULAR DEVICE IN CONTAINER-TRAYS FOR PRESERVING FOOD

[76] Inventor: Rafael De Jaen Tolbaños, Infanta Maria Teresa 9, 280 16 Madrid, Spain

[21] Appl. No.: 571,932
[22] PCT Filed: Apr. 24, 1995
[86] PCT No.: PCT/ES95/00043
  § 371 Date: Jan. 5, 1996
  § 102(e) Date: Jan. 5, 1996
[87] PCT Pub. No.: WO96/06553
  PCT Pub. Date: Mar. 7, 1996

[30] Foreign Application Priority Data

Aug. 26, 1994 [ES] Spain ................... 9402267 U
Jan. 26, 1995 [ES] Spain ................... 9500220 U

[51] Int. Cl.⁶ ........................................ A47F 5/00
[52] U.S. Cl. ..................... 211/126; 211/71; 312/31.1
[58] Field of Search .................. 211/126, 71, 162, 211/94; 312/31.1

[56] References Cited

U.S. PATENT DOCUMENTS

| | | | |
|---|---|---|---|
| 1,240,908 | 9/1917 | Weis et al. | 211/126 |
| 2,192,102 | 2/1940 | Pinto | 211/126 |
| 3,428,187 | 2/1969 | Baggott | 211/126 X |
| 3,563,394 | 2/1971 | Joyce | 211/126 |
| 3,627,393 | 12/1971 | Hickson et al. | 312/31.1 |
| 4,377,241 | 3/1983 | Schreiner | 211/126 X |

FOREIGN PATENT DOCUMENTS 0287555 10/1988 European Pat. Off. .
2040141  1/1971 France .

Primary Examiner—Robert W. Gibson, Jr.
Attorney, Agent, or Firm—Ladas & Parry

[57] ABSTRACT

A modular device for keeping and storing food products in container trays includes a plurality of hinged supports supporting one or more container trays each having an ideally rectangular configuration and a hollow interior. Each container is topped at its upper part with a tight and transparent closure lid. The container trays, which project from both sides of their supports, are separated from one another on each support. Each support has a projection which is removably and securably inserted into an opening of a receiving body through a channel made in the receiving body. The plurality of receiving bodies are joined together by a flexible element which allows for rotation of the container trays. In another embodiment for the plurality of hinged supports, it is possible to use a link and pin arrangement rotatably connecting one support to its neighboring supports.

16 Claims, 4 Drawing Sheets

MODULAR DEVICE IN CONTAINER-TRAYS FOR PRESERVING FOOD

BACKGROUND OF THE INVENTION

The present specification refers to a modular device in container-trays for preserving food, the purpose of which is to solve the scattered storage that, container by container, is carried out by users for preserving sausages or left-overs of food, since this invention is a modular and unitary assembly formed by several transparent and hermetic containers placed on trays which are capable of being tilted, solving the existing problem experienced by users to know the contents of same, which, in the case of this invention, can be perfectly preserved for a long time, making clearly easy to store and arrange sausages and other foodstuffs, and allowing them to be chosen in a direct and simplified way.

1. Field of the Invention

This invention applies to the field of the industry devoted to the manufacture of accessories for household equipment.

2. Related Art

The applicant knows nothing about the existence of any container assembly having these characteristics with this new application and utility, since what is known until now refers always to unitary and independent containers, which are not capable of solving the problem solved by this invention, and having no possibility of attaining this new application and utility, allowing also other sizes and tray to be used, according to a user's wishes.

SUMMARY OF THE INVENTION

The modular device in container trays for preserving food, as proposed by the invention constitutes per sea clear novelty in the field to which it is incorporated.

In a more definite way, the modular device in container trays for preserving food of this invention is constituted starting from a tray, on which an indeterminate number of containers are incorporated, each of these containers being provided with a hermetic cover, allowing consequently the food contained in it to be conveniently preserved.

One of the sides of the tray carrying the containers is fitted with an extension of same, in an appropriate size, this extension being ended with a projection having a circular configuration, so allowing the tray to be inserted into a holding support constituted as a female element.

The female element, acting as a supporting area, is bonded or fixed to other elements having similar characteristics, by means of a flexible system, in order to allow it to be properly folded, and later to receive different container trays by using the above-mentioned support.

This arrangement allows different types of food, mainly pork products in general, to be placed within container trays, so that a user can select the food he/she prefers to eat in a more simple and easy way, due to the fact that the hermetic cover of the container is made of a transparent material through which the contained product can be easily seen.

BRIEF DESCRIPTION OF DRAWINGS

In order to complement this description and aid to a better understanding of the features of the invention, the accompanying drawings which are a part of this specification, show in an illustrative but non limitative sense, the following.

DESCRIPTION OF THE PREFERRED EMBODIMENTS

Figure 1:
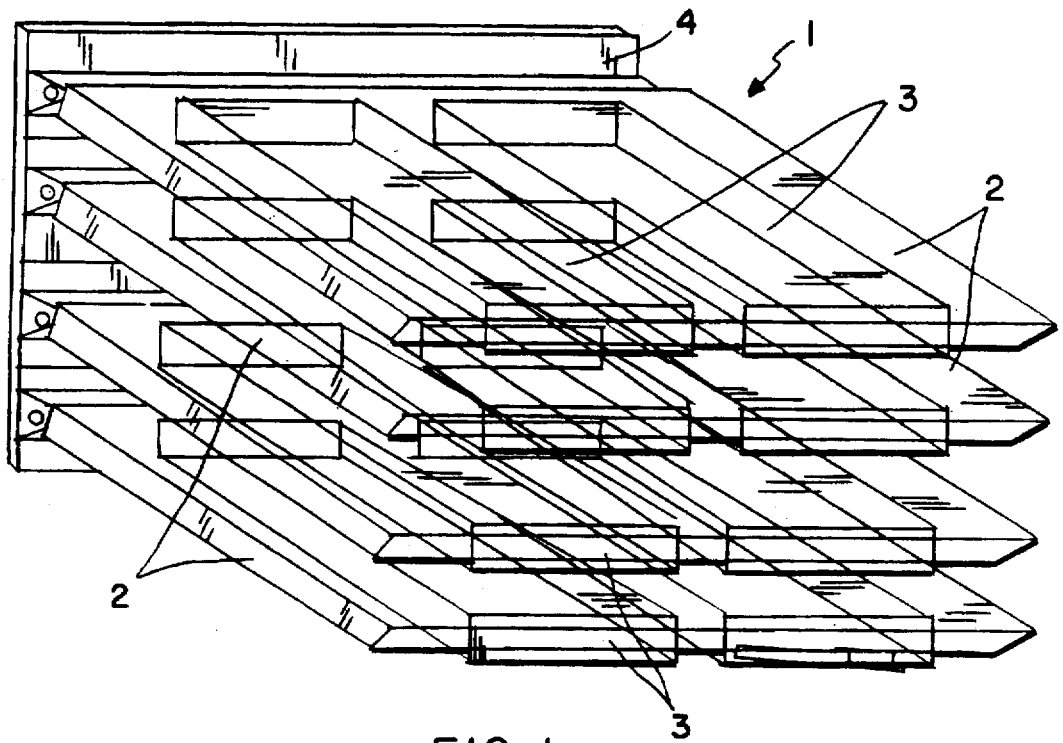
FIG. 1 shows a perspective view of the object of the invention related to a modular device in container trays for preserving food.
Figure 2:
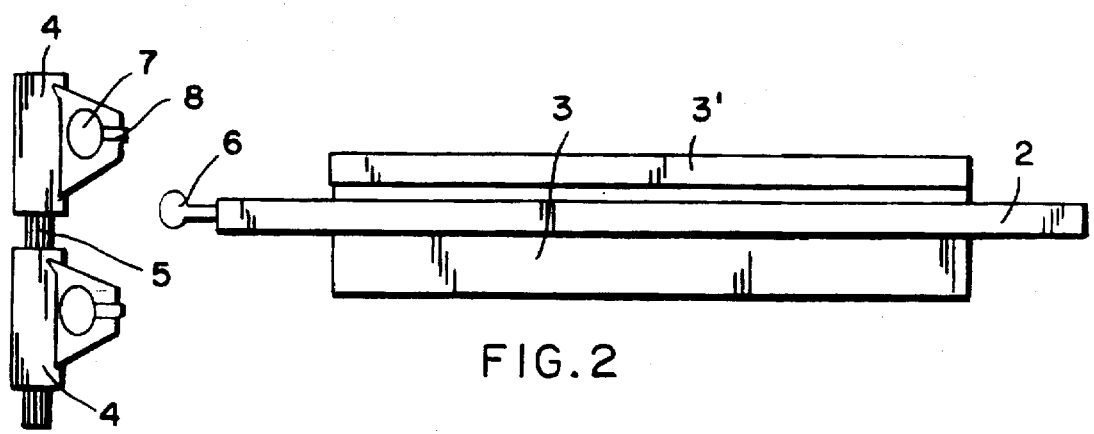
FIG. 2 shows a side elevational view of a container tray incorporated into the assembly, this figure showing also a side view of a coupling element between two trays.

FIG. 1 shows the manner in which the modular device in container trays for preserving food (1) is constituted starting from a plurality of supporting elements (2), having a rectangular or quadrangular plan configuration, on which containers forming a monoblock assembly (3) are located, and fitted with a transparent and hermetic cover (3'), and an oval-shaped stud (6) emerging from one of their larger branches, the function of which is to be fixed to many other receiving bodies (4), which joined each other by a flexible body or element, allow them to be moved and dropped, achieving that each of these bodies (4) will receive the stub (6) via a groove (8), in order to incorporate same within an oval receptacle (7), to be fitted in it and be locked inside, so allowing to form an assembly of bodies or elements (2), joined one other by parts (4), and allowing to be moved in an upward vertical sense until reaching at least 180°, so that an user can check the products held in the containers (3) through the transparent, hermetic covers (3'), and carry out an appropriate choice of same.

Figure 3:
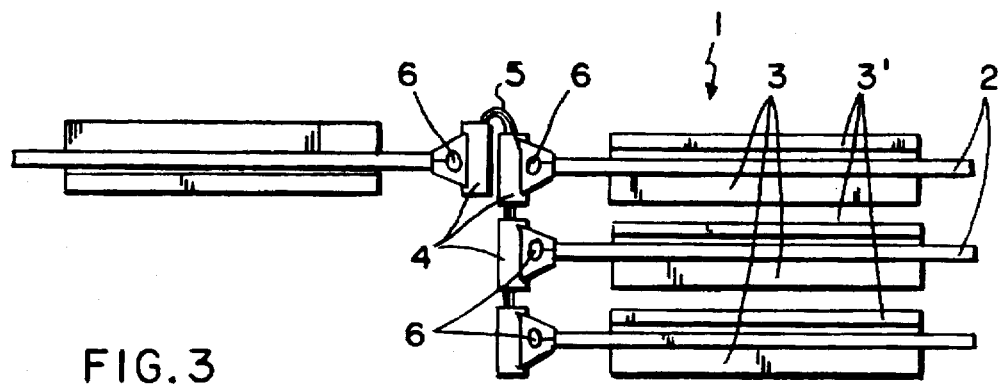
FIG. 3 shows a side elevation view of the object illustrated in FIG. 1, and showing also one of trays displaced.

FIG. 3 shows again how the supporting bodies (2), holding the containers (3) with their transparent, hermetic cover (3'), have a projection located at one of the larger branches, configured as an oval-shaped blunt body (6), vertically located, which enters openings (7) through a groove (8), emerging from a trapezoidal shoulder arising from bodies (4), joined one other by means of a flexible joining element (5) allowing the containers (3) with their covers (3'), containing the food to be chosen by a consumer, to be dropped up to 180° minimum.

Figure 4:
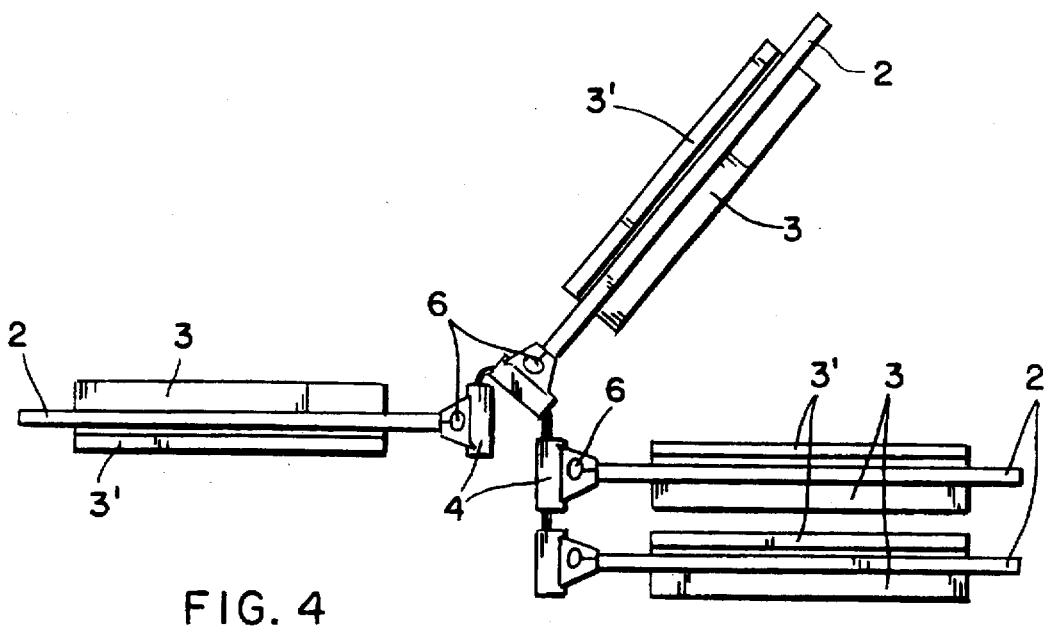
FIG. 4 shows again a view similar to that illustrated in FIG. 3 of the object shown in FIG. 1, with a tray tilted and a tray pivoting.
Figure 5:
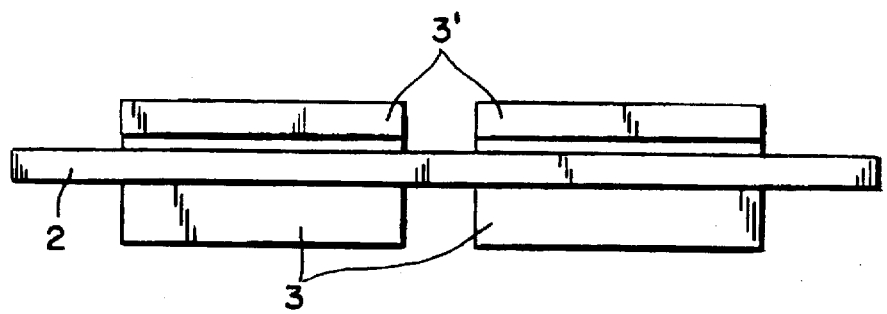
FIG. 5 shows a front elevational view of the container tray represented in FIG. 2, in a unitary way, with its hermetic and—transparent cover.
Figure 6:
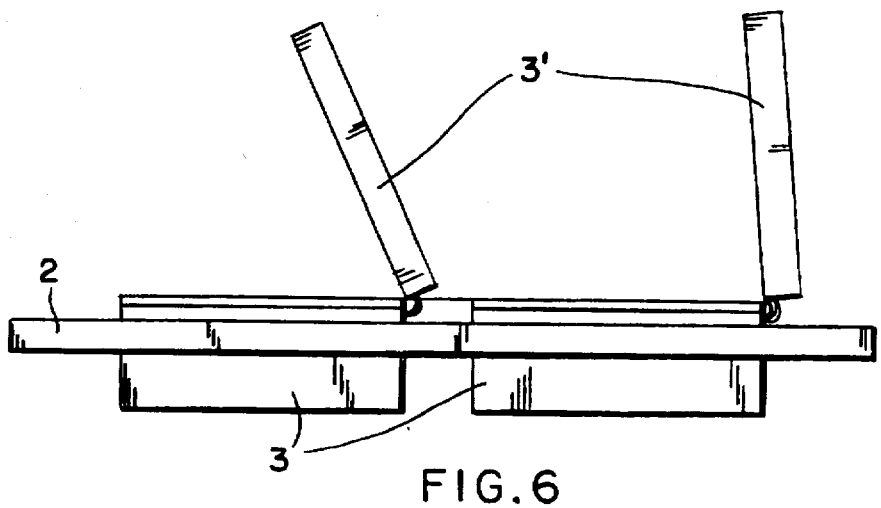
FIG. 6 is a front elevational view of the object illustrated in FIGS. 2 and 5, with its cover opened.

FIG. 4 shows again an assembly operation.

Figure 7:
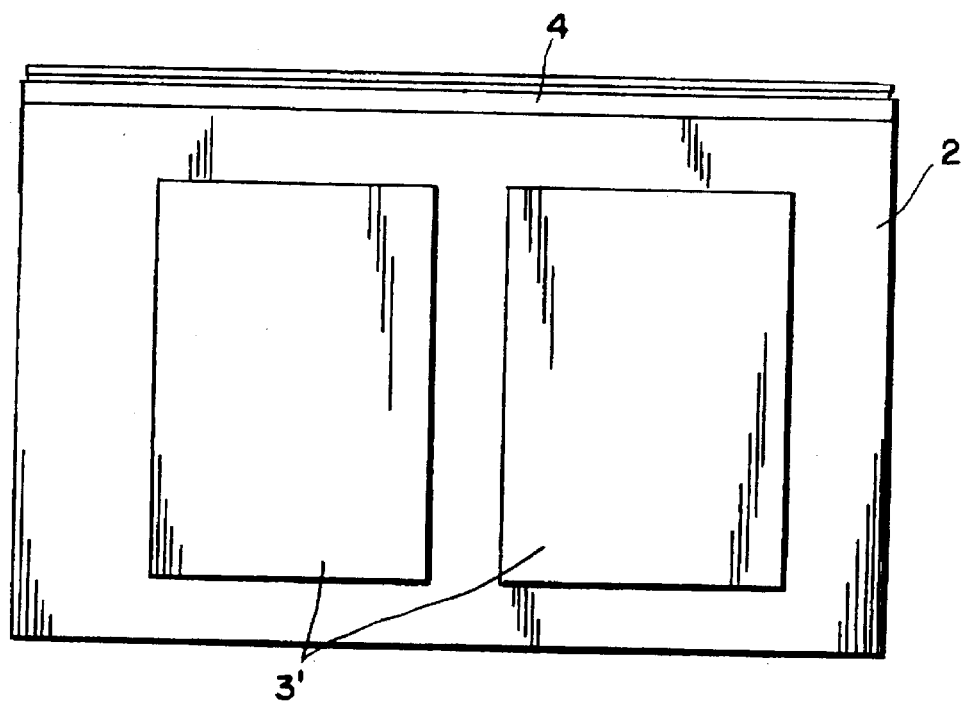
FIG. 7 is a plan view of the object shown in FIGS. 2, 5 and 6.

In FIG. 7, it can be seen a plan view of the supporting—elements (2) of containers (3), carrying transparent, hermetic covers (3').

Figure 8:
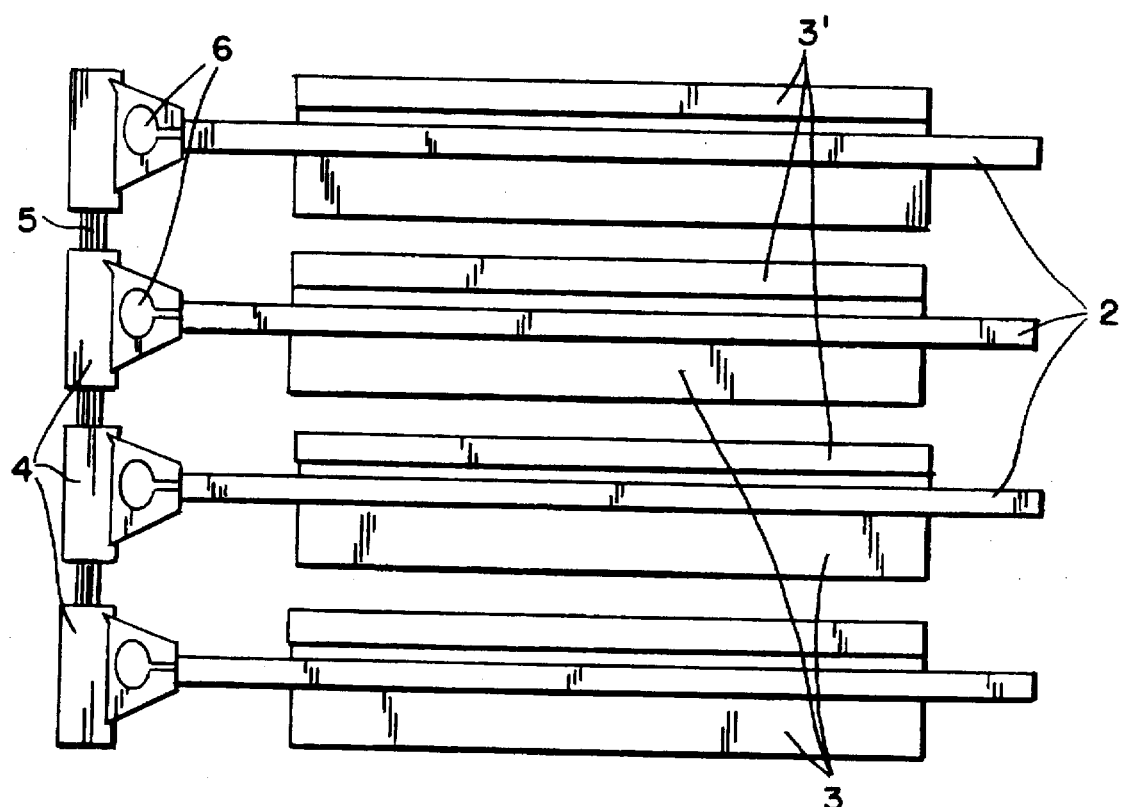
FIG. 8 is a side elevational view of the object shown in FIG. 1.

FIG. 8 illustrates a side view of an assembly according to the invention.

Figure 9:
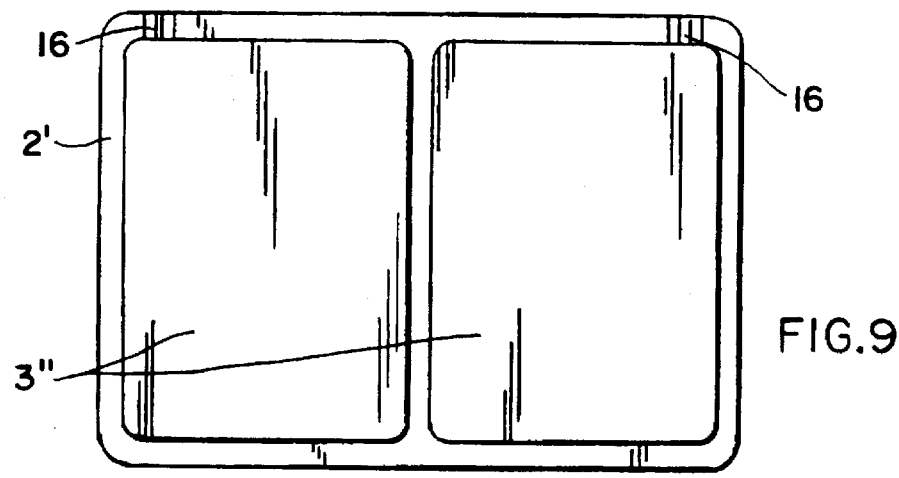
FIG. 9 is a plan view of the container trays bonded to a rib perimetrically surrounding same in order to join the own elements, as well as the pivots located on the back of the trays, in a second embodiment.
Figure 10:
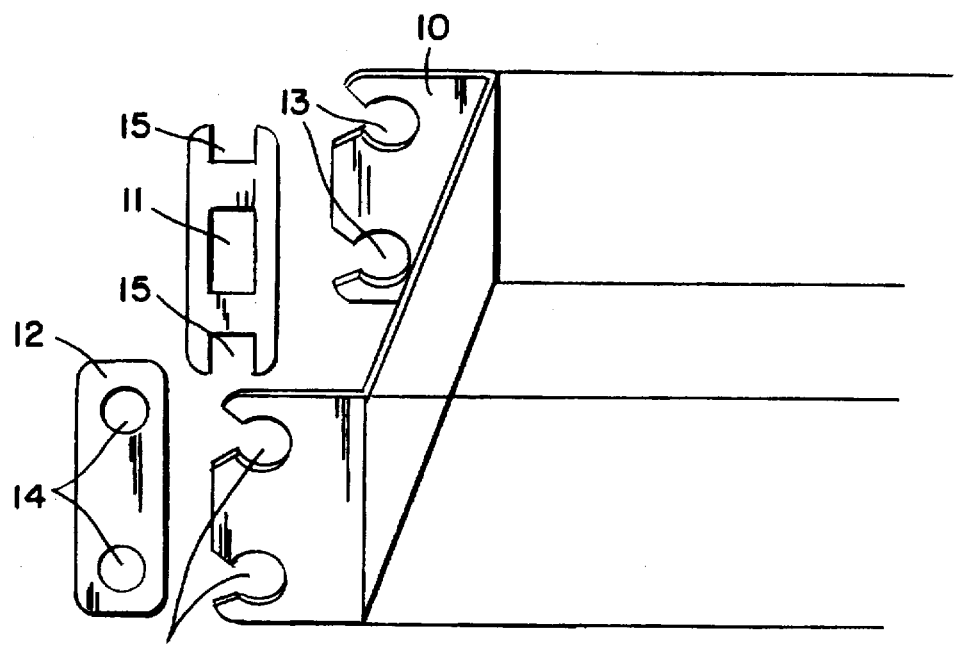
FIG. 10 is a side view of pivots located on the trays, being peg shaped, to be inserted into the receiving geometric part shown in FIG. 11.
Figure 11:
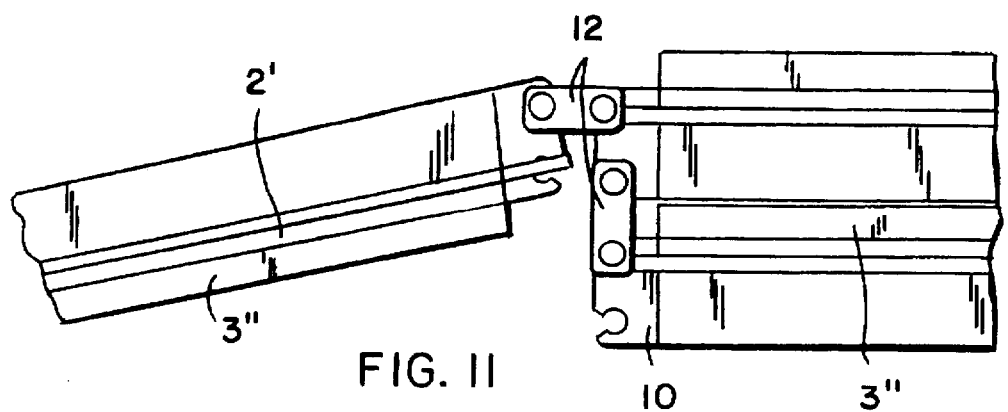
FIG. 11 is, lastly, a side elevational view of an assembly—composed of several trays with containers, joined and assembled by the above-mentioned parts shown in FIG. 10.

In FIG. 9, it is represented a second embodiment of the invention, which is constituted starting from a carrying body (2'), on which containers fitted with covers (3") are incorporated, being also of a transparent and hermetic nature, having a shape which is similar to covers (3'), as shown in the preceding figures.

In order to obtain a union of these supporting elements (2') between similar bodies, projections (10) fitted with openings (13) are incorporated to same, the function of them being to receive stubs (14) emerging from a part (12), and, consequently to avoid their motion, one of the stubs acting as an embedding link in the lower parte (2'), while the upper stub fits in the projection (10) of the upper part, the stubs (14), carried by the part (12), being fixed in openings (13) by a movement of a supplementary part (11) having grooves or openings (15) at its ends, this part (11) forming a retaining and actuating element for parts (2'), and acting as an adequate bonding element.

Lastly, it is to be noted that FIG. 9 shows splits (16) located at the edge area (2'), on which the hermetic trays are located, these splits being designed to expedite the embedding and bonding operation of same in the retaining areas (13).

It is not considered necessary to extend more this description for an expert in the art to understand and deduce the scope of the invention and its advantages on the use, utility and new application for preserving and arranging foodstuffs.

I claim:

1. A container tray device comprising:
   a plurality of stacked supports, each of said supports having one or more cavities formed therein,
   a plurality of container trays, each said container tray having a recess formed therein, each said tray removably and securably received within one of said cavities of said supports,
   a projection extending from each of said supports;
   a plurality of receiving bodies, each said receiving body having a groove formed therein, each said groove shaped to receive and secure the projection of one of said supports,
   a flexible element attached to each of said plurality of receiving bodies, said flexible element permitting each of said supports to rotate with respect to one another.

2. The container tray device as claimed in claim 1, wherein:
   each of said supports further comprises an upper surface and a lower surface,
   each of said container trays further comprises an upper portion and a lower portion,
   each of said cavities comprises a hole extending through its respective support.
   said upper portion and said lower portion of each of said container trays extending beyond the upper surface and lower surface of each of said supports, respectively.

3. The container tray device as claimed in claim 1, further comprising:
   a plurality of tray covers each covering and sealing said recess of said container trays.

4. The container tray device as claimed in claim 3, wherein:
   each of said plurality of tray covers is made of a transparent material.

5. The container tray device as claimed in claim 3, wherein:
   each of said plurality of tray covers hermetically seals the recess it covers.

6. The container tray device as claimed in claim 1, wherein:
   the projection extending from each of said supports is pivotally received within one of said plurality of receiving bodies.

7. The container tray device as claimed in claim 1, wherein:
   said flexible element permits said plurality of supports to rotate at least 180 degrees with respect one another.

8. The container tray device as claimed in claim 1, wherein:
   each of said supports further comprises at least one edge wherein to transversal recesses are formed in a harmonical arrangement.

9. A container tray device comprising:
   a plurality of stacked supports, each of said supports having one or more cavities formed therein,
   a plurality of container trays, each said container tray having a recess formed therein, each said tray removably and securably received within one of said cavities of said supports,
   a first projection and a second projection extending in a parallel fashion from each said support, said first and said second projection each having an upper hole and a lower hole formed therethrough,
   a plurality of links each having an upper stub and a lower stub extending therefrom, the lower stub of each link being pivotally received within the upper hole of one of said projections of one said supports and the upper stub of each link being pivotally received within the lower hole of one of said projections of an adjacent support,
   means for retaining the upper stub and lower stub of each of said plurality of links within their respective holes,
   whereby said links pivotally connect the projections of adjacent supports such that the lower stubs within the upper holes of each support and the upper stubs within the lower holes of each support permit rotational movement of the supports with respect to one another.

10. The container tray device as claimed in claim 9, wherein:
    said means for retaining the upper stub and lower stub of each of said plurality of links within their respective holes comprise a plurality of retaining elements, each of said retaining elements having retaining openings formed therein to receive and retain the first and second stubs of one of said plurality of links.

11. The container tray device as claimed in claim 9, wherein:
    each of said supports further comprises an upper surface and a lower surface,
    each of said container trays further comprises an upper portion and a lower portion,
    each of said cavities comprises a hole extending through its respective support,
    said upper portion and said lower portion of each said container trays extending beyond the upper surface and lower surface of each of said supports, respectively.

12. The container tray device as claimed in claim 9, further comprising:
    a plurality of tray covers each covering and sealing said recess of each of said container trays.

13. The container tray devices as claimed in claim 12, wherein:
    each of said plurality of tray covers is made of a transparent material.

14. The container tray device as claimed in claim 12, wherein:

each of said plurality of tray covers hermetically seals the recess it covers.

15. The container tray device as claimed in claim 9, wherein:

said plurality of links permit said plurality of supports to rotate at least 180 degrees with respect one another.

16. The container tray device as claimed in claim 9, wherein:

each of said supports further comprises at least one edge wherein two transversal recesses are formed in a harmonical arrangement.

* * * * *